June 28, 1932.  F. M. A'HEARN ET AL  1,865,292
DRIVING BOX
Filed Aug. 30, 1930  2 Sheets-Sheet 1
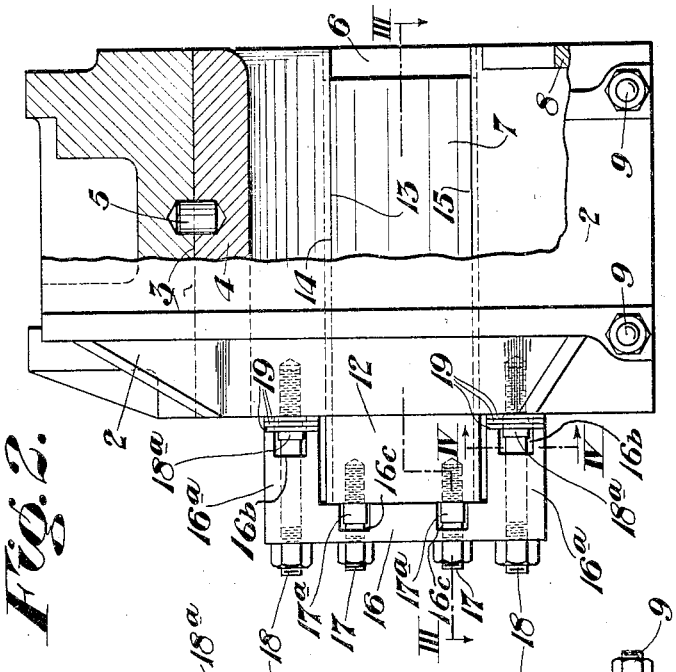
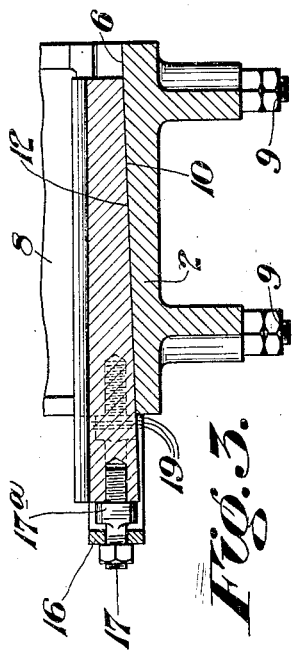
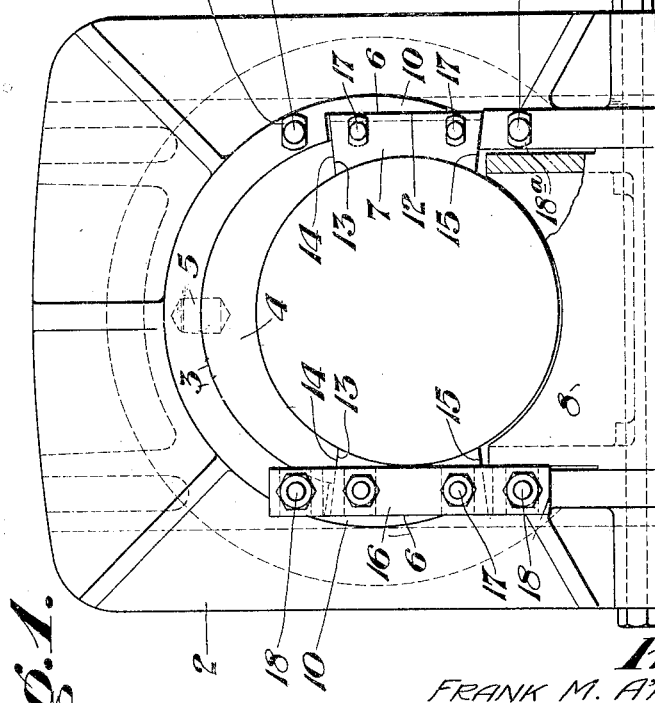
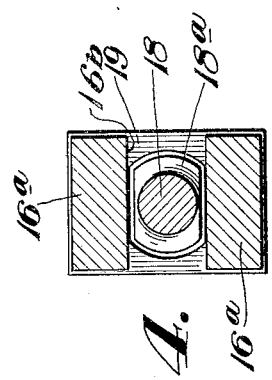
Inventors:
FRANK M. A'HEARN and
EDWIN FOSTER RICHARDSON.
by: *Alsina & Rauber*
their Attorneys

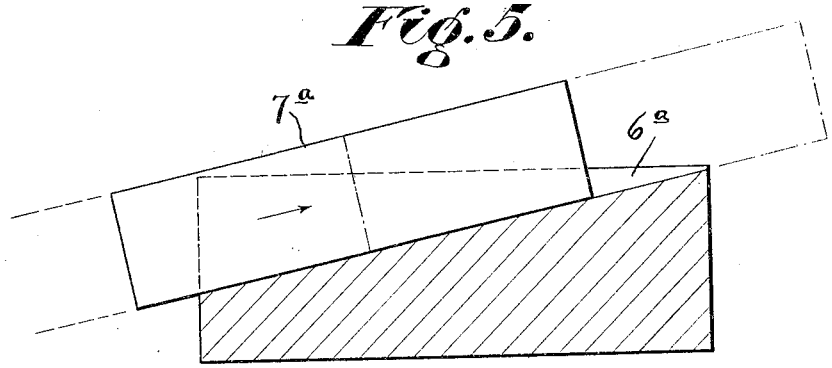
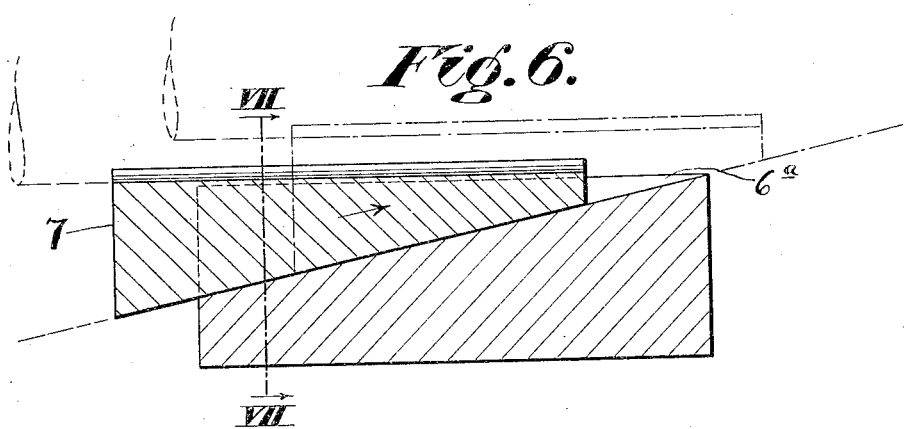
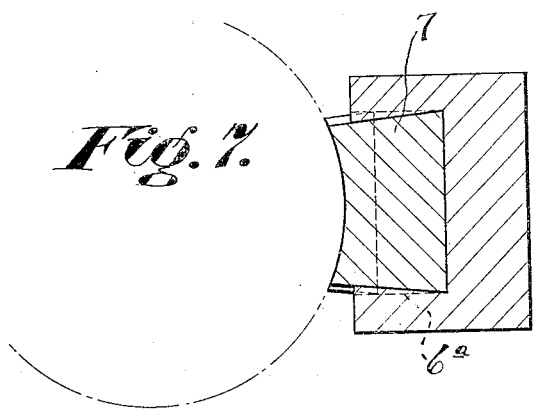

Patented June 28, 1932

1,865,292

UNITED STATES PATENT OFFICE

FRANK M. A'HEARN AND EDWIN FOSTER RICHARDSON, OF GREENVILLE, PENNSYLVANIA

DRIVING BOX

Application filed August 30, 1930. Serial No. 478,946.

This invention, a continuation in part of application No. 404,991, filed November 5, 1929, relates to vehicle journal boxes and more particularly to driving-boxes for locomotives and has for its object the provision of a driving-box which is of simple and rugged construction and of moderate cost, is convenient, durable, effective in use and affords unusually good bearing for taking horizontal thrust like the piston thrust, for example, of a locomotive; is easy to remove, adjust and repair, and is free from serious drawbacks and defects of bearings of this class.

In driving-boxes of the type generally in use on locomotives whether of the standard length or of the extended or long main box type, the bearing encircles the driving-journal of the axle for one-half of its circumference or less. Such boxes are applied to the axles by lowering the driving-box with its contained bearing directly onto the journal portion of the axle, which necessarily limits the contact between the bearing and journal to one-half the circumference of the journal. This prior art construction is, therefore, such that the bearings wear very rapidly at their lower edges which are approximately on the horizontal center line of the journal or slightly above said line. Such bearings do not provide adequate bearing surfaces to receive the heavy horizontal thrusts which are transmitted to the boxes through the driving-journals, with the result that the bearings wear faster or "pound out" along the horizontal center line which makes it necessary to remove, rebore and refit the bearings.

In the driving-boxes of the type generally in use, the bearings are pressed into the box under pressure which makes it necessary to remove the box in order to replace or repair the bearings.

All of the above operations entail a great deal of expense and delay and are objectionable, these having been overcome in the driving-box construction of this invention. In addition, the horizontal bearing area adjacent the center line of the journal has been increased and means provided for adjusting the bearings to compensate for wear without removing or dismantling the box.

Another feature of this invention is the provision of a construction in which the bearings may be readily removed and replaced without removing or dismantling the box.

In the drawings:

Figure 1 is an end elevation of a driving-box constructed in accordance with this invention.

Figure 2 is a side elevation of the driving-box of Figure 1, partly in section.

Figure 3 is a fragmentary sectional plan taken on the line III—III of Figure 2.

Figure 4 is a sectional elevation taken on the line IV—IV of Figure 2.

Figure 5 is a diagrammatic illustration showing how a rectangular block operates in a groove having an inclined back wall.

Figures 6 and 7 illustrate diagrammatically the operation of the thrust bearing of this invention.

Referring more particularly to the drawings, the numeral 2 designates the driving-box as a whole which is of the general, approved design in use on standard locomotives except that it has been slightly modified to adapt it to the use of this invention. The box 2 is machined, as at 3, to receive the crown bearing 4, which bearing is adapted to be positioned by means of a dowel-pin 5.

Grooves 6 are also machined in the side walls of the box to receive side or horizontal thrust bearings 7. The lower end of the box is closed by a grease pan or cellar 8 which is held in position by tie-bolts 9.

The vertical side walls 10 of the grooves 6 are inclined or tapered inwardly toward the hub end of the box and the thrust bearings 7 have their inner or bearing faces 12 inclined or tapered reversely to the side walls of the grooves 6 so that longitudinal movement of the thrust bearings in the grooves 6 will cause said bearings to move toward or away from the axle journaled therein while maintaining the bearing faces of said bearings parallel with the axis of said axle.

The grooves 6 have a greater vertical dimension through the vertical dimension of the thrust bearings 7 so that said bearings fit loosely and have a material play in said grooves.

The lower edge surfaces 14 of the crown bearing 4 and bottom walls of the grooves 6 are tapered or inclined outwardly and upwardly and outwardly and downwardly, respectively, at approximately 6 degrees and the top and bottom faces 13 and 15, respectively, and the thrust bearings are similarly tapered in the reverse directions so as to have a dove-tail fit therewith.

The wedge-shaped thrust bearings 7 are of such vertical dimensions as to fit snugly between the inclined lower edges of the crown bearing 4 and the inclined bottom faces of the grooves 6. However, due to the fact that the inner faces or bearing surfaces of the thrust bearings are tapered longitudinally in a reverse direction to the taper of the side or back walls of the grooves 6, the thrust bearings are free to move longitudinally in the grooves 6 since there is no relative transverse movement between the top and bottom inclined faces of the bearings and the reversely inclined lower edges of the crown bearing and the bottom faces of the grooves 6.

In other words, the thrust bearings are simply advanced or moved longitudinally so as to advance inwardly the thickened bearing face into contact with the axle.

In order to clearly illustrate the theory on which the thrust bearings 7 operate, reference is made to Figure 5 in which a plain dovetailed block 7ª is shown slidable in a dovetailed groove 6ª having an inclined back wall. If it is assumed that the block 7ª and the dovetailed groove 6ª are beveled on a six (6) degree angle from their backs it will be seen that the groove must necessarily be constantly wider toward its shallow end, due to the shortening of the length of the six (6) degree angle. Therefore, the block will slide freely.

Now, if it is desired to maintain the outer face of the block parallel to the block and to a bearing surface, such as the axle in a driving box, it is only necessary to cut away the front or outer face of the block on an angle equal to the angle of the back wall of the groove but in the reverse direction, as shown in Figure 6.

By cutting off the front or outer face of the block and forming said face concave the thrust bearing 7 of this invention, as illustrated on a slightly exaggerated scale, in Figures 6 and 7, is formed.

In assembling the driving-box the crown bearing is first mounted in position and the thrust bearings 7 are then inserted in the grooves 6 and moved longitudinally until they contact with the axle and since such thrust bearings fit snugly between the lower inclined walls of the grooves 6 and the lower inclined edge faces of the thrust bearing 4 said crown bearing will be held firmly in position by said thrust bearings when they are moved into operative position.

In order to maintain the thrust bearings 7 in position, U-shaped retaining clamps 16 are fitted over the large ends of the thrust bearings and have their leg portions 16ª engaged with the box 2. The retaining clamps 16 are secured to the box 2 by studs 18 which are threaded into the box 2 until their collars 18ª jam against the box. The bearings 7 are also secured to the retaining clamp by studs 17 which are threaded into the large ends of the thrust bearings 7 until their collars 17ª jam against the ends of the bearings.

The legs 16ª of the clamp 16 and the body portion of the clamp are recessed, as at 16ᵇ and 16ᶜ, respectively, to receive the collars 18ª and 17ª, respectively, on the studs 18 and 17 and thus prevent turning of said studs while said clamp is in position.

One or more washers or shims 19 are preferably mounted between the ends of the clamps 16 and the box for the purpose of adjustment.

When it is desired to adjust the thrust bearings 7 to take up wear, the clamps 16 will be loosened or removed and one or more of the washers or shims 19 will be removed. The clamps will then be tightened or replaced and drawn up against the box 2, thus forcing the bearings 7 along the grooves 6 and causing them to advance and move the thickened portion in against the axle journal. After all the shims or washers 19 have been removed from between the legs of the clamps and the box they may be mounted between the end of the thrust bearings 7 and the clamp and further adjustment of the bearings will result, and when the limit of adjustment has been thus secured, further adjustment may still be had by either substituting other clamps with shorter legs or by machining off a part of the legs of the original clamps.

From the above it will readily be seen that we have provided a novel arrangement of driving-box bearings that may be easily applied to standard driving-boxes by slightly modifying said boxes.

It will also be noted that since the thrust bearings 7 serve to hold the crown bearing in position, it is only necessary to remove the thrust bearings and raise the driving-box a sufficient distance to permit the crown bearing to drop and free the dowel-pin 5 in order to remove the crown bearing.

In order to remove the thrust bearings 7 the clamp 16 may be used as a puller, that is, the nuts on the several studs 18 and 17 will be loosened and the shims 19 will be increased, then by tightening the nuts on the studs 17 the thrust bearings will be pulled or moved outwardly.

While we have shown and described one specific embodiment of our invention, it will be understood that we do not wish to be limited thereto, since various modifications may be made without departing from the scope thereof, as defined in the appended claims.

We claim:

1. A locomotive driving-box assembly comprising in combination a driving-box, a crown bearing, and separate one-piece wedge-shaped thrust bearings along each side of said box, said thrust bearings being slidably movable into and out of said box, and one-piece substantially U-shaped clamp members for locking said thrust bearings in place and for moving said bearings in and out of said box, stud bolts threaded into said box above and below said thrust bearings and extending through longitudinally extending apertures in the legs of said clamps, other stud bolts threaded in the ends of said thrust bearings and extending through apertures in the body of said clamps, collars on said stud bolts adapted to limit the movement of said studs into said box and said bearing respectively, and adapted to be jammed against said box and said bearings to lock said studs against displacement, said U-shaped clamp members having their legs and bodies provided with squared recesses to receive said collars and lock said studs against turning, nuts on the outer ends of said stud bolts adapted to be tightened against said clamps, removable shim members mounted around some of said stud bolts and against which said clamp members are tightened, said shim members being adapted to be removed or added to permit adjustment of said thrust bearings.

2. A locomotive driving-box assembly comprising in combination a driving-box, a crown bearing and separate one-piece wedge-shaped thrust bearings along each side of said box, said thrust bearings being slidably movable into and out of said box, and one-piece substantially U-shaped clamp members for locking said thrust bearings in place and for moving said bearings in and out of said box, stud bolts threaded into said box above and below said thrust bearings, and extending through longitudinally extending apertures in the legs of said clamps, other stud bolts threaded in the ends of said thrust bearings and extending through apertures in the body of said clamps, means carried by said studs and adapted to be jammed against said box and said bearings to prevent displacement of said studs, said U-shaped clamp members having their legs and bodies provided with squared recesses to receive said means and lock said studs against turning, nuts on the outer ends of said stud bolts adapted to be tightened against said clamps.

In testimony whereof, we have hereunto set our hands.

FRANK M. A'HEARN.
EDWIN FOSTER RICHARDSON.